United States Patent [19]

Dean, Jr.

[11] Patent Number: 5,600,998
[45] Date of Patent: Feb. 11, 1997

[54] LEVEL SENSOR OFFSET MOUNTING MECHANISM

[76] Inventor: William R. Dean, Jr., 2414 Ralph St., Houston, Tex. 77006-2427

[21] Appl. No.: 386,709

[22] Filed: Feb. 10, 1995

[51] Int. Cl.$^6$ .............................. G01F 23/30; G01F 23/38
[52] U.S. Cl. .................................. 73/309; 73/319
[58] Field of Search ........................ 73/313, 319, 290, 73/305, 866.5, 317

[56] References Cited

U.S. PATENT DOCUMENTS

| | | | |
|---|---|---|---|
| 175,522 | 6/1892 | Kojima | 70/182 |
| 4,495,810 | 4/1983 | Tessarzik, et al. | 73/866.5 |
| 4,554,494 | 9/1984 | Howeth | 73/305 |
| 5,006,834 | 3/1989 | Fountain | 73/319 |
| 5,072,618 | 9/1990 | Taylor et al. | 73/317 |
| 5,311,776 | 4/1993 | Morris | 73/317 |

OTHER PUBLICATIONS

Red Jacket Electronics, Electronic Tank Guaging/Leak Detection, May 1993.

*Primary Examiner*—William A. Cuchlinski, Jr.
*Assistant Examiner*—Vagnola Khamvongsa
*Attorney, Agent, or Firm*—Keeling Law Firm

[57] ABSTRACT

A level sensor offset mounting mechanism that mounts in the tank fill pipe of an underground fuel tank and provides an offset for the lower level sensor portion from the drop tube. The level sensor offset mounting mechanism connects to an inner wall of the tank fill pipe by a connector. A conduit extends vertically downward from the connector to a position below the top of the tank. At the lower end of the conduit, a selectively rotatable offset device provides a horizontal offset away from the drop tube. The offset device may be rotated to an insertion position, wherein no offset is provided, to facilitate insertion, or extraction, of the level sensor into the tank. Connected to the offset device at an end distal the connection to the upper portion, the lower portion of the level sensor measures the fuel and water levels within the tank. This lower portion generally includes an instrumentation housing, a lower conduit, a fuel level float, a water level float, and a magnetostrictive device for determining the positions of the floats. The level sensor offset device is designed such that electrical wiring may be passed therethrough without allowing fuel vapors to escape the tank.

10 Claims, 3 Drawing Sheets

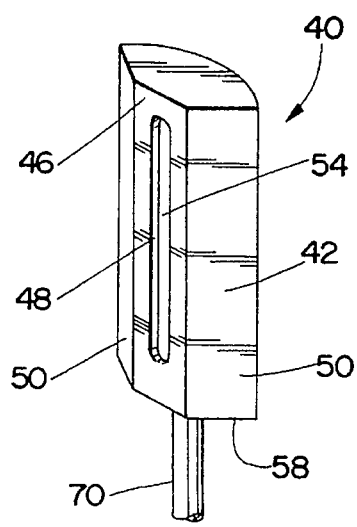
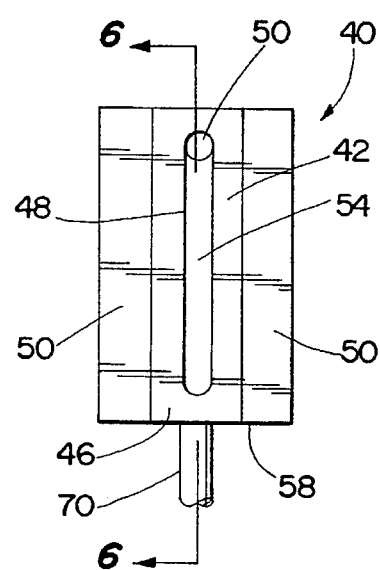
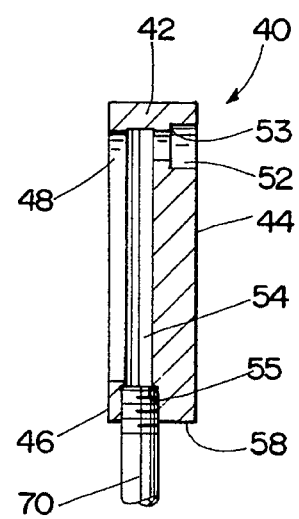
Fig. 4        Fig. 5        Fig. 6
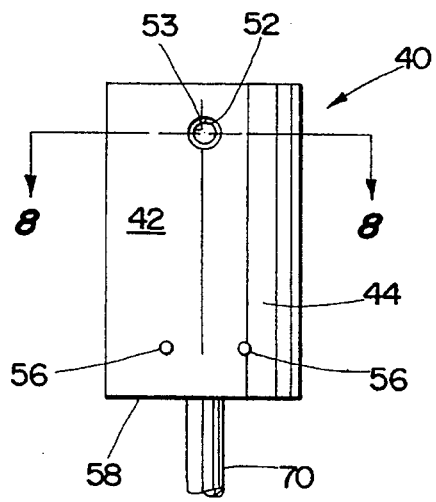
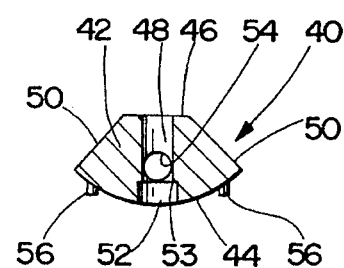
Fig. 7        Fig. 8
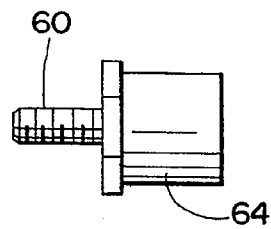
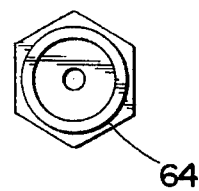
Fig. 9        Fig. 10        Fig. 11

LEVEL SENSOR OFFSET MOUNTING MECHANISM

BACKGROUND OF THE INVENTION

This invention relates to a level sensor for insertion in an underground fuel tank. More specifically, it is directed to an improved level sensor offset mounting mechanism that allows convenient incorporation of the level sensor into an existing underground tank.

Large underground fuel tanks, such as those used at gasoline filling stations, typically have a tank fill pipe extending from ground level to a top end of the tank. Within the tank fill pipe, a drop tube extends from ground level to a position near the bottom of the tank. There is a relatively small, set clearance between the tank fill pipe and the drop tube.

Generally, the fuel tanks contain not only fuel but also water. To ensure an adequate supply of fuel, to track the inventory of fuel in the tank, and to determine the leakage from the tank, the levels of both the fuel and the water in the tank must be determined. One type of level sensor, a magnetostrictive level sensor, uses one float that floats at the water level and another float that floats at the fuel level. The position of these floats is determined electronically and transmitted to an instrumentation housing then to a display device.

Presently, the majority of the level sensors and the electrical wiring required to transmit the information to the display device are installed through an unused bung in the top of the tank. Installation of a level sensor in an unused bung requires a disinterring of the tank and subsequent repair of the surface. Disinterring a tank is both expensive and disruptive.

A second method of mounting the level sensor and associated electrical wiring is to install the level sensor through the fill pipe. Mounting of the level sensor through the fill pipe, however, requires installation of a specially designed, slotted drop tube to allow conduit for the level sensor to run therethrough.

One such level sensor that is mounted through the tank fill pipe, utilizes an ultrasonic level measurement device and a collapsible offset mounting mechanism. The collapsible offset mechanism is designed specifically for use with an ultrasonic level measurement device and will not work with a magnetostrictive level sensor because it provides insufficient support. In addition, the collapsible offset mounting mechanism requires a number of parts connected at hinged joints and is, therefore, relatively costly.

Though the above mentioned level sensors may be helpful in measuring the levels within the tank, they can be improved to enable installation in existing tanks through the tank fill pipe. In addition, they can be improved to provide an offset with sufficient support to permit the use of a magnetostrictive level sensor and, at the same time, reduce the number of parts, thereby, reducing the cost and complexity of the offset.

SUMMARY OF THE INVENTION

Accordingly, the objectives of this invention are to provide, inter alia, a level sensor offset mounting mechanism that:

provides a conduit for level sensor electrical wiring that extends through the gap between the tank fill pipe and the drop tube;

provides an offset of the level measuring floats from the drop tube;

provides connection of the level sensor offset mounting mechanism to the tank fill pipe;

allows installation through the tank fill pipe of a level sensor that measures the level of water and fuel and the temperature in a tank;

permits selective horizontal offset of the lower portion of the level sensor;

allows implementation into existing underground tanks without a disinterring of the tank or site excavation;

conserves vertical space within the tank allowing measurement of the full range of the allowable tank capacity of 95 percent;

provides sufficient support for a magnetostrictive level sensor; and provides an offset device that is low in cost and requires few parts.

To achieve such improvements, my invention is a level sensor offset mounting mechanism that has a rotatable, lockable extension arm to selectively provide horizontal offset of the lower portion of the level sensor from the upper portion of the level sensor.

The level sensor offset mounting mechanism has a connector for connecting the level sensor offset mounting mechanism to a tank fill pipe inner wall. One face of the connector has an opening that extends at least partially horizontally through the body of the connector. The opening is circular and threaded. Generally, this face is convex and arcuate to conform to the concave, arcuate wall of the tank fill pipe. A hollow threaded nipple threadably engages the opening and securely fastens the connector to the tank fill pipe wall. A vertical cavity extends from the bottom end of the connector and intersects the opening. A hollow upper conduit connects to the bottom end of the connector and extends downward. The conduit's cavity is aligned and in communication with the vertical cavity of the connector. Thus, electrical wiring may pass through the threaded nipple, into the connector opening, down through the vertical cavity, and through the conduit.

The offset mounting mechanism is positioned at the lower end of the upper conduit. The offset mounting mechanism has two main parts, the hinge frame and the extension body. The hinge frame is fixedly attached to the upper conduit and generally comprises two spaced parallel side walls. The side walls are connected and maintained by at least one connector wall. Each side wall has a centrally-located, circular opening.

The extension body has two spaced parallel flanges an elongated extension arm, and connectors. The distance between the flanges is slightly greater than the distance between the exterior surface of the hinge frame side walls. Therefore, when in operating position, the inner surface of the flanges are slidably adjacent to and in contact with the exterior surface of the hinge frame side walls. Each flange also has a centrally-located, circular opening therethrough. The flange openings and the hinge frame side wall openings are axially aligned when in operating position. A hinge pin extends through the openings and permits rotation of the flanges of the extension body relative to the hinge frame.

The elongated extension arm extends from the flanges at a position offset from the axis of the openings. At an end of the elongated extension arm distal the flanges, connectors provide eyelets for connecting an instrumentation housing. This connector to instrumentation housing connection permits their relative rotation. Therefore, the electrical wiring extends from the upper conduit, through the hinge frame and extension body, and to the instrumentation housing.

Detents on the inner surface of the flanges mate with detent receivers in the side walls to provide a locking mechanism for maintaining the extension arm in either a horizontal or vertical position. The detents and detent receivers are sufficient to (1) prevent the lower portion of the level sensor from swinging during insertion and (2) support the lower portion of the level sensor when the extension arm is extended.

Extending below the instrumentation housing, a lower conduit supports a pair of annular floats. One of the floats is designed to float at the water level; and the other float is designed to float at the fuel level. Magnetostrictive components within the floats and the lower conduit as well as electrical devices in the instrumentation device, detect the positions of the floats.

BRIEF DESCRIPTION OF THE DRAWING

The manner in which these objectives and other desirable characteristics can be obtained is explained in the following description and attached drawings in which:

FIG. 4 is an isometric view of the connector.

FIG. 5 is a side elevational view of the connector.

FIG. 6 is a cross sectional view of the connector taken along lines 6—6 in FIG. 5.

FIG. 7 is a side elevational view of the connector.

FIG. 8 is a cross sectional view of the connector taken along lines 8—8 in FIG. 7.

FIG. 9 is a side elevational view of the gasket.

FIG. 10 is a side elevational view of the nipple and coupler.

FIG. 11 is an end elevational view of the coupler.

DETAILED DESCRIPTION OF THE INVENTION

Figure 1:
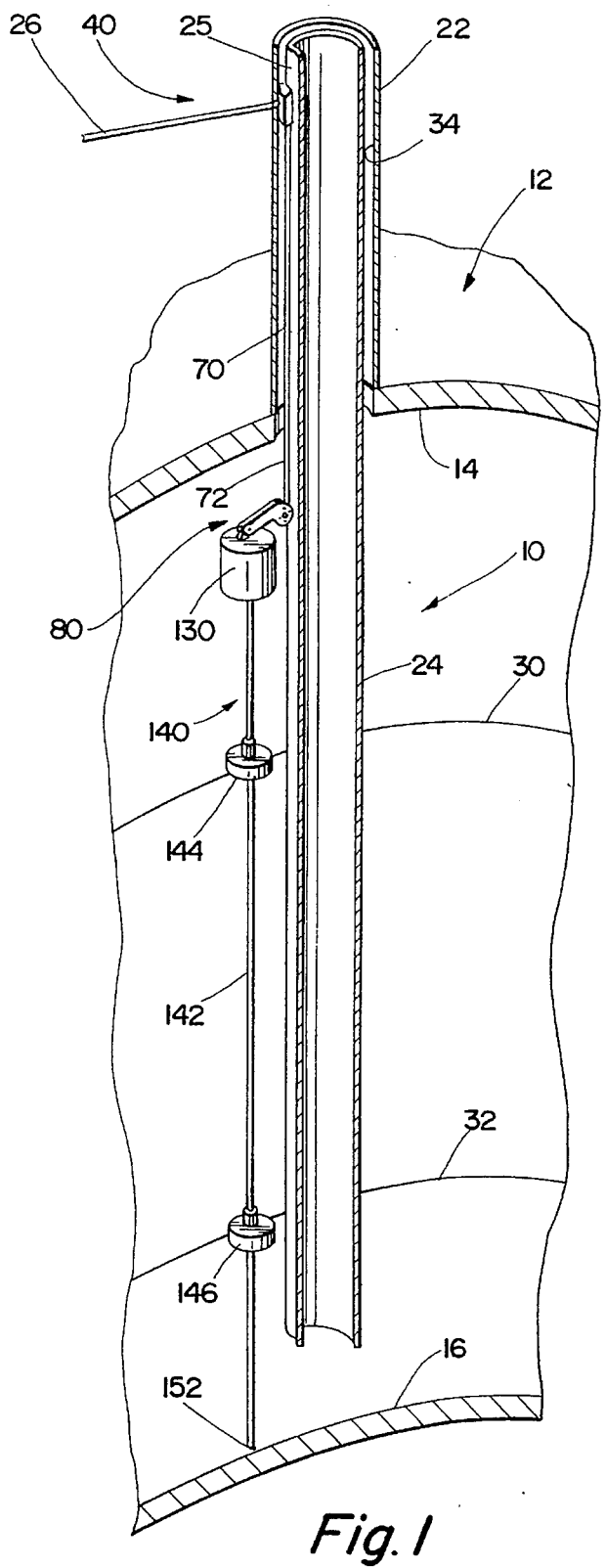
FIG. 1 is a partial sectional isometric view of the tank, tank fill pipe, drop tube, and level sensor offset mounting mechanism.
Figure 2:
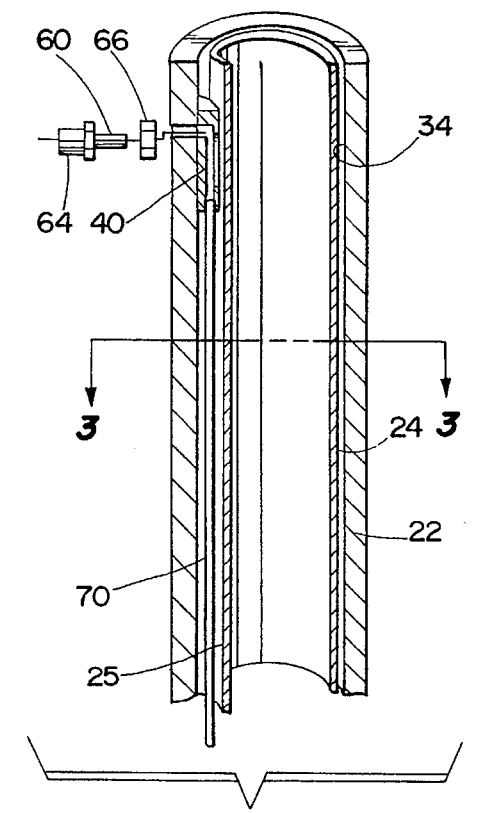
FIG. 2 is a partial sectional isometric view of the tank fill pipe, the drop tube, the connection means, and the upper conduit.
Figure 3:
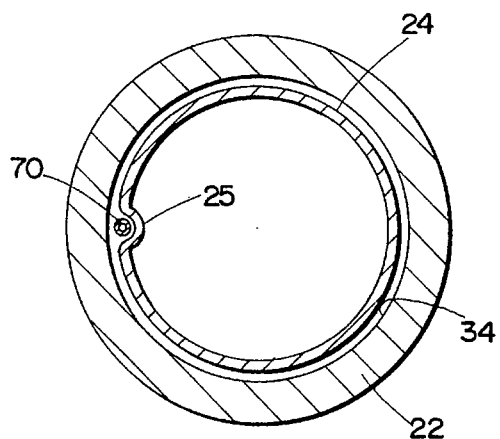
FIG. 3 is a cross sectional view taken along lines 3—3 in FIG. 2.
Figure 12:
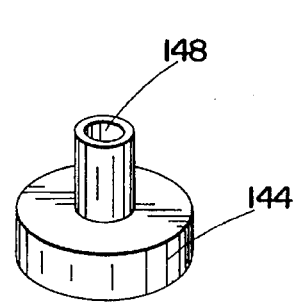
FIG. 12 is an isometric view of a float.
Figure 13:
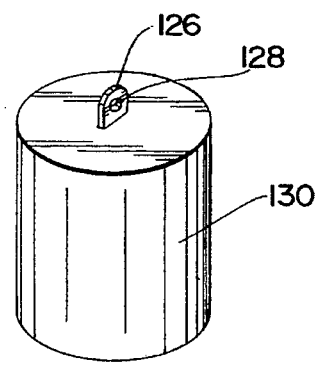
FIG. 13 is an isometric view of the instrumentation housing.
Figure 14:
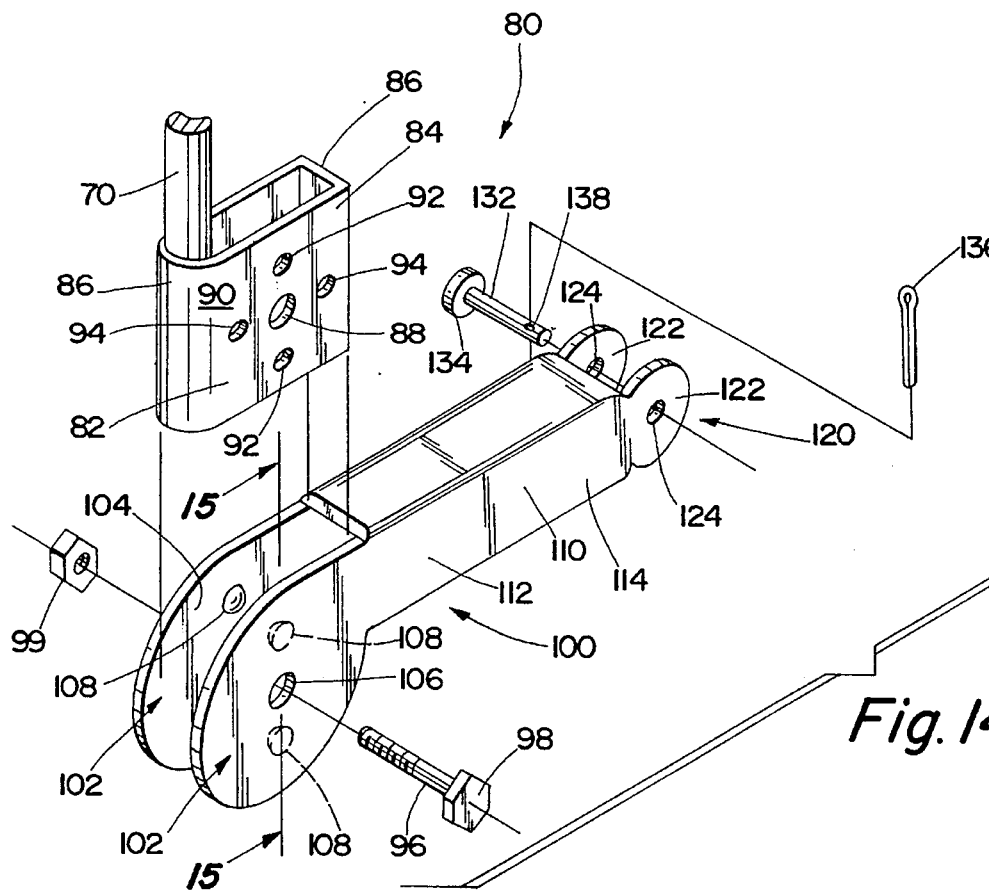
FIG. 14 is an isometric view of the offset means.
Figure 15:
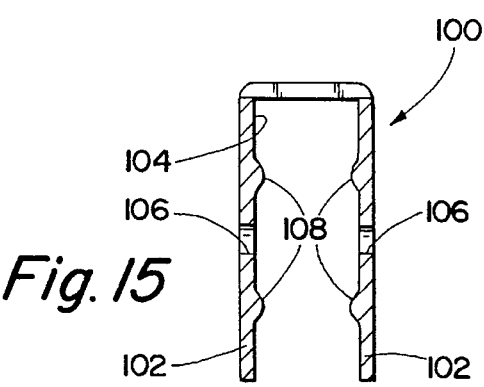
FIG. 15 is a cross-sectional view of the extension arm taken along lines 15—15 in FIG. 14.

The preferred embodiment of my invention is illustrated in FIGS. 1 through 15 and the level sensor offset mounting mechanism is depicted as 10.

Generally, an underground fuel tank 12 has a tank fill pipe 22 that extends from ground level to the top 14 of the tank 12. See FIGS. 1 through 3. A typical tank fill pipe 22 has an inner diameter of four inches. Within the tank fill pipe 22, a drop tube 24 extends from ground level to a point within the tank 12 near the bottom 16 of the tank 12. The outer diameter of the drop tube 24 is slightly smaller than the inner diameter of the tank fill pipe 22 to facilitate placement of the drop tube 24 in the fill pipe 22. Additionally, in the present invention, a special drop tube 24 that has a vertically-extending, concave indentation 25 that extends its full length is used. The purpose of the indentation is to provide clearance between the drop tube 24 and the tank fill pipe 22 for the level sensor mechanism 10 to extend therethrough. In addition, the drop tube 24 is removable from the tank 12 and tank fill pipe 22.

A connector means 40 facilitates connection of the level sensor offset mounting mechanism 10 to a tank fill pipe inner wall 34. The connector means 40 has a body 42 with a pipe wall contact face 44, an inner face 46 opposite the pipe wall contact face 44, two side walls 50, and a bottom end 58 (FIGS. 4 through 8). In the preferred embodiment, the pipe wall contact face 44 is convexly arcuate and is designed to conform to the inner wall of the tank fill pipe 22. With this arcuate design, the pipe wall contact face 44 abuts the inner wall 34 of the tank fill pipe 22.

An opening 52 in the pipe wall contact face 44 extends horizontally into the body 42. Generally, the opening 52 has a circular cross-section and is threaded. Extending vertically upward from the bottom end 58 of the body 42, a cavity 54 intersects the opening 52. Thus, the opening 52 and the cavity 54 define a passageway through the body 42. This passageway is sized and constructed to transmit electrical wiring therethrough. To facilitate positioning the electrical wiring in the passageway, a vertically-extending slot 48 in the inner face 46 provides access to the cavity 54. Because the electrical wiring must make a right angle turn within the passageway, the slot 48 enhances ease of installation. After installation of the electrical wire, the slot 48 is potted to prevent fuel vapors from escaping through the connector body 42.

In the preferred embodiment, the side walls 50 slant inward from the pipe wall contact face 44 to the inner face 46. Consequently, the pipe wall contact face 44 has a greater surface area than the inner face 46.

A threaded nipple 60 (FIGS. 2 and 10) extends through the tank fill pipe 22 and threadably engages the opening 52. An opening shoulder 53 prevents the nipple 60 from screwing too far into the body 42 and damaging the electrical wiring. A threaded coupler fitting 64 (FIGS. 2, 10 and 11) also threadably engages the nipple 60 at a position exterior to the tank fill pipe 22. The coupler fitting 64 abuts a gasket 66 (FIGS. 2 and 9) placed between the coupler fitting 64 and the tank fill pipe 22. The gasket 66 prevents water from entering the tank 12 and prevents fuel vapors from escaping the tank 12. The gasket abuts the tank fill pipe 22 when the coupler fitting 64 is tightened and pulls the body 42 against the tank fill pipe inner wall 34. In this way, the connector means 40 is secured to the tank fill pipe 22. The nipple 60 is hollow and permits transmission of electrical wiring therethrough.

Fixedly attached to the connector means 40, an upper conduit 70 extends vertically downward. Although the upper conduit 70 may be secured to the connector body 42 in a variety of ways, the preferred manner is to provide at least one set screw 56 that extends from the pipe wall contact face 44, through the body 42, and into the cavity 54. Preferably, the set screw 56 is flush with the pipe wall contact face 44. The upper conduit 70 extends into the cavity 54 and is held in place by the tightened set screw 56. A cavity shoulder 55 prevents the upper conduit 70 from extending too far into the cavity 54 and damaging the electrical wiring.

The upper conduit 70 is hollow and has an annular cross-section. The purpose of the upper conduit 70 is to transmit electrical wiring therethrough. Therefore, the upper conduit 70 is sized and constructed accordingly. The upper conduit 70 extends from the connector body bottom end 58 vertically downward to a position within the tank 12 below the tank top 14.

Connected to the upper conduit lower end 72, a rotatable offset means 80 provides selective horizontal offset of the lower portion 140 from the upper conduit 70. See FIGS. 14 and 15. This offset is necessary to prevent the annular fuel float 144 (FIG. 12) and the annular water float 146 from contacting the drop tube 24 and fouling their measurements. The rotatable offset means generally comprises a hinge frame 82 secured to the upper conduit lower end 72 and an extension body 100 rotatably attached to the hinge frame 82.

The hinge frame 82 has two spaced parallel side walls 84. These side walls are maintained by at least one connector wall 86. In the preferred embodiment, the hinge frame 82 comprises one plate bent in a 'U' shape. The radius of curvature of the 'U' is substantially equal to the outside radius of the upper conduit 70. The sides of the 'U' are parallel and form the side walls 84. A separate flat plate connects the side walls 84 distal the curved end of the 'U' and comprises a connecting plate 86.

A centrally located opening 88 extends through each of the side walls 84. The openings 88 are circular in their cross-section and are axially aligned with one another. Further, the openings are sized and constructed to receive a hinge pin 96 therethrough that facilitates rotation of the extension body 100.

The extension body 100 comprises a pair of spaced parallel flanges 102, an elongated extension arm 110, and an attachment means 120 for attaching the extension body 100 to the lower portion 140. Each of the flanges 102 has a centrally-located flange opening 106 that has a circular cross-section. The flange openings 106 are axially aligned. In addition, the flanges 102. are sufficiently spaced so that each flange inner surface 104 may be placed next to a hinge frame side wall external surface 90. The extension body 100 is positioned relative to the hinge frame 82 such that the flanges 102 are slidably adjacent to and in contact with the side walls 84. Thus, the width of the hinge frame 82 as measured from the exterior surface 90 of one side wall 84 to the exterior surface 90 of the opposite side wall 84. is slightly less than the width of the space between the flanges 102 as measured from the inner surface 104 of one flange 102 to the inner surface 104 of the opposite flange 102. When in position, the flange openings 106 and the side wall openings 88 are axially aligned.

The hinge pin 96 passes through the flange openings 106 and the side wall openings 88 and provides a hinge allowing relative rotation of the hinge frame 82 and the extension body 100. One end of the hinge pin 96 has a head 98 that prevents the hinge pin 96 from passing completely through the flange opening 106. Additionally, the hinge pin 96 is threaded and a threaded hinge pin nut 99 threadably engages the end of the hinge pin 96 distal the head 98. By adjusting the hinge pin nut 99, the force between the flanges 102 and the side walls 84 may be selectively varied, thereby, varying the friction force. With less force applied, the extension body 100 rotates with more ease relative to the hinge frame 82.

The elongated extension arm 110 extends from its first end 112 attached to the flanges 102 to a distal second end 114. The extension arm 110 is offset from axis of the flange openings 106. Consequently, when a sufficient force is applied proximal the second end 114 of the extension arm 110, the extension body 100. rotates relative to the hinge frame 82. The length of the extension arm 110 is sufficient to offset the lower portion 140 and prevent the annular fuel float 144 and the annular water float 146 from contacting the drop tube 24.

Detents 108 extend from the inner surface 104 of the flanges 102. Preferably, two detents 10S on each flange 102 are aligned with and equidistant from the flange openings 106. Correlative to the detents 108, detent receivers, 92 and 94, in the side walls 84 operate to receive the detents 108. One set of detent receivers, the offset position detent receivers, 92 are positioned to receive the detents 108 when the extension body 100. is in an offset position wherein the lower portion 140 is horizontally offset from the upper conduit 70 and the extension arm 110 is substantially perpendicular to the upper conduit 70. Another set of detent receiver, the insertion position detent receivers, 94 are positioned to receive the detents 108 when the extension body 100 is in an insertion position wherein the extension arm 110 is substantially parallel to the upper conduit 70. Preferably, the offset position detent receivers 92 are vertically aligned with the side wall openings 88; and the insertion position detent receivers 94 are horizontally aligned with the side wall openings 88. These detent receivers, 92 and 94, are either small holes through the side walls 84 or small indentations in the side walls 84.

The detents 108 and detent receivers, 92 and 94, comprise a locking means and are constructed to maintain the extension body 100 in the desired position. However, when a sufficient force is applied to the extension arm 110, the detents 108 and detent receivers, 92 and 94, are constructed to release and allow relative rotation of the hinge frame 82 and the extension body 100.

Proximal the second end 114 of the extension arm 110, the attachment means 120 provides a hinged attachment to the lower portion 140. Because this attachment is hinged, the lower portion 140 is self leveling. In the preferred embodiment, the attachment means 120 comprises a pair of spaced parallel attachment plates 122. Axially-aligned openings 124 in the attachment plates 122 permit insertion of an attachment pin 132. An eyelet 126 (FIG. 13) having an opening 128 therethrough is designed to fit between the attachment plates 122. When in position, the attachment pin 132 passes through both the attachment plate openings 124 and the eyelet opening 128 and provides a rotation hinge. The eyelet 126 is secured to the lower portion 140. Therefore, the lower portion 140 is free to rotate relative to the extension body 100 pursuant to gravitational forces applied to the lower portion 140. To maintain the attachment pin 132 in the openings, 124 and 128, one end of the attachment pin 132 has a head 134 and the distal end is designed to receive a cotter pin 136 through a cotter pin receiving hole 138.

The lower portion 140 comprises an instrumentation housing 130, a lower conduit 142, an annular fuel float 144, and an annular water float 146. In the preferred embodiment, the eyelet 126 attaches to the instrumentation housing 130. To facilitate insertion of the level sensor offset mounting mechanism 10 through the tank fill pipe 22, the instrumentation housing 130 is cylindrical and has a diameter smaller than a tank fill pipe 22 diameter. A typical tank fill pipe 22 diameter is four inches. Because the extension arm 110 is offset from the axis, when the extension body 100 is in the offset position, the instrumentation housing 130 is below the extension arm 110 and adjacent to the flanges 102. Therefore, the extension arm 110 length must be greater than the radius of the instrumentation housing 130. However, to prevent the instrumentation housing 130, and the other components of the lower portion 140, from swinging horizontally into the drop tube 24, the distance between the flanges 102 and the instrumentation housing 130, when the extension body 100 is in the offset position, is relatively small. With a small distance between the instrumentation housing 130 and the flanges 102, if the instrumentation housing 130 swings horizontally toward the flanges 102, the instrumentation housing 130 will contact the flanges 102. Thus, the small distance restricts the horizontal movement of the instrumentation housing 130 and prevents it from contacting the drop tube 24. Further, in the present invention, the distance is sufficiently small to prevent the lower portion 140 from contacting the drop tube 24. This abutment design is important because tanks 12 often settle once placed underground. When the tank 12 settles, the tank fill pipe 22 and drop tube 24 lose their vertical alignment. Consequently, because the level sensor mechanism 10 extends vertically due to gravity, a level sensor offset mechanism 10 without the abutment feature might contact the drop tube 24 and, thus, not properly function. Without the abutment feature, the exact angle of the drop tube 24 from vertical must be determined.

The lower conduit 142 extends vertically downward from the instrumentation housing 130 to the bottom 16 of the tank 12. Two floats, an annular fuel float 144 and an annular water float 146, have central cavities, 148 and 150 respectively. The cavities, 148 and 150, are sized and constructed so that the floats, 144 and 146, fit around the lower conduit 142 and are slidably positioned on the lower conduit 142. The lower end 152 of the lower conduit 142 forms a lip that prevents the floats, 144 and 146, from sliding off the lower conduit 142. The annular fuel float 144 is positioned above the annular water float 146 and is design to float at the fuel level 30. Likewise, the annular water float is designed to float at the water level 32. Utilizing magnetostrictive components located in the lower conduit 142 and the floats, 144 and 146, along with electronic equipment in the instrumentation housing 130, the fuel level 30 and water level 32 are measured.

Installation of the level sensor offset mounting mechanism 10 is accomplished with the tank 12 buried underground. First, the drop tube 24 is removed from the tank fill pipe 22. Next, a hole is provided in the side of the tank fill pipe 22. Typically, the existing drop tube 24 does not have the required vertically-extending, concave indentation 25. Therefore, a new drop tube 24 having the vertically-extending, concave indentation 25 is typically required. The extension body 100 is rotated to the insertion position and locked in position by the detents 108 and the insertion position detent receivers 94. Then, the level sensor offset mounting mechanism 10 is lowered, lower portion 140 first, through the tank fill pipe 22 into the tank 12.

When the lower conduit bottom end 152 reaches the tank bottom 16, additional downward force is applied to the level sensor offset mounting mechanism upper conduit 70. Because the extension arm 110 is offset from the axis of the flange openings 106, the downward force induces a torsional force on the flanges 102. With sufficient torsional force, the detents 108 release from the insertion position detent receivers 94 and the extension body 100 rotates relative to the hinge frame 82. This rotation continues until the extension body reaches the offset position and the detents 108 encounter the offset position detent receivers 92.

Once the extension body 100 is in the offset position, the connector body 42 is secured to the tank fill pipe 22 by nipple 60 and coupler fitting 64. The drop tube 24 having the vertically-extending, concave indentation 25 is then placed in the tank fill pipe 22.

I claim:

1. A level sensor offset mounting mechanism comprising:

an upper conduit;

a connector means for connecting the upper conduit to a tank fill pipe;

said connector means constructed to receive an electrical wiring therethrough;

said upper conduit extending downward from said connector means;

said upper conduit having a lower end;

a lower portion for measuring the fluid levels within a tank;

a rotatable offset means for selectively providing horizontal offset of said lower portion from said upper conduit;

said lower portion attached to and extending downward from said rotatable offset means;

said rotatable offset means proximal said upper conduit lower end; and a locking means for locking said rotatable offset means in either an offset position wherein said lower portion is horizontally offset from said upper conduit or an insertion position wherein said lower portion is not offset from said upper conduit.

2. A level sensor offset mounting mechanism as claimed in claim 1 wherein said connector means comprises:

a body having a pipe wall contact face, a top end, and a bottom end;

said pipe wall contact face having an opening therein;

said opening extending horizontally at least partially through said body;

a vertical cavity in said body;

said vertical cavity extending from said bottom end and intersecting said opening;

said opening and said vertical cavity constructed to receive and transmit said electrical wiring therethrough.

3. A level sensor offset mounting mechanism as claimed in claim 2 wherein said pipe wall contact face is convexly arcuate and constructed to conform to an inner wall of said tank fill pipe.

4. A level sensor offset mounting mechanism as claimed in claim 2 wherein said body further comprises:

an inner face opposite said pipe wall contact face;

a slot in said inner face; and said slot providing access to said vertical cavity throughout said slot's length.

5. A level sensor offset mounting mechanism as claimed in claim 2 wherein said connector means further comprises:

a threaded nipple having a cavity therethrough;

said opening having threads therein;

said threaded nipple threadably engaging said opening; and said threaded nipple constructed to secure said body to said tank fill pipe and receive said electrical wiring therethrough.

6. A level sensor offset mounting mechanism as claimed in claim 1 wherein said lower portion comprises:

an instrumentation housing attached to said rotatable offset means;

a lower conduit;

an annular water float slidably positioned on said lower conduit;

said annular water float constructed to float at the water level within said tank;

an annular fuel float slidably positioned on said lower conduit;

said annular fuel float constructed to float at the fuel level within said tank;

said annular fuel float positioned above said annular Water float; and a position measuring means for transmitting the position of said annular water float and said annular fuel float to said instrumentation housing.

7. A level sensor offset mounting mechanism as claimed in claim 1 wherein said rotatable offset means comprises:

a hinge frame fixedly attached to a lower end of said upper conduit;

said hinge frame including two spaced parallel side walls and at least one connector wall;

said at least one connector wall extending between said side walls;

each of said side walls having an exterior surface distal said opposite side wall;

a side wall opening in each of said side walls having an axis;

said side wall openings substantially axially aligned;

an extension body;

said extension body including two spaced parallel flanges, an elongated extension arm, and an attachment means for attaching said extension body to said lower portion;

each of said flanges having an interior surface proximal said opposite flange;

each of said flange's interior surface slidably positioned adjacent to and in contact with said exterior surface of said side walls;

a flange opening in each of said flanges having an axis;

said flange openings substantially axially aligned;

said side wall openings and said flange openings substantially axially aligned;

a hinge pin rotatably positioned through said side wall openings and said flange openings;

said elongated extension arm having a first end and a distal second end;

said first end connected to said flanges;

said elongated extension arm extending from said flanges at a position offset from said flange opening axis; and said attachment means connected to said extension arm proximal said second end.

8. A level sensor offset mounting mechanism as claimed in claim 7 wherein said locking means comprises:

at least one offset position detent receiver in each of said side wall's exterior surface;

at least one insertion position detent receiver in each of said side wall's exterior surface;

at least one detent in each of said flange's interior surface;

said at least one detent constructed and positioned to engage said at least one offset position detent receiver when said elongated extension arm is in said offset position; and said at least one detent further constructed and positioned to engage said at least one insertion position detent receiver when said elongated extension arm is in said insertion position.

9. A level sensor offset mounting mechanism as claimed in claim 8 wherein:

the number of offset position detent receivers is two; and said offset position detent receivers are vertically-aligned with and equidistant from said side wall openings.

10. A level sensor offset mounting mechanism as claimed in claim 8 wherein:

the number of insertion position detent receivers is two; and said insertion position detent receivers are horizontally-aligned with and equidistant from said side wall openings.

* * * * *